United States Patent
Takanezawa et al.

(10) Patent No.: US 9,246,201 B2
(45) Date of Patent: Jan. 26, 2016

(54) BATTERY TEMPERATURE CONTROL DEVICE

(75) Inventors: Yuki Takanezawa, Sagamihara (JP); Atsushi Takano, Sagamihara (JP); Takashi Iimori, Tokyo (JP); Kazuhiko Okino, Yokohama (JP); Hisashi Niioka, Yokohama (JP); Naoki Yamamoto, Kawasaki (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 246 days.

(21) Appl. No.: 13/822,084

(22) PCT Filed: Feb. 29, 2012

(86) PCT No.: PCT/JP2012/055056
§ 371 (c)(1),
(2), (4) Date: Mar. 11, 2013

(87) PCT Pub. No.: WO2012/124478
PCT Pub. Date: Sep. 20, 2012

(65) Prior Publication Data
US 2013/0183554 A1  Jul. 18, 2013

(30) Foreign Application Priority Data
Mar. 11, 2011  (JP) .................. 2011-054083

(51) Int. Cl.
*H01M 10/615* (2014.01)
*H01M 10/633* (2014.01)
(Continued)

(52) U.S. Cl.
CPC ........ *H01M 10/5022* (2013.01); *H01M 10/486* (2013.01); *H01M 10/5006* (2013.01);
(Continued)

(58) Field of Classification Search
CPC ............ H01M 10/50; H01M 10/5006; H01M 10/5022; H01M 10/5024; H01M 10/5036; H01M 10/5038; H01M 10/615; H01M 10/633; H01M 10/635; H01M 10/486
See application file for complete search history.

(56) References Cited

U.S. PATENT DOCUMENTS 7,413,827 B2   8/2008  Inui
2005/0264257 A1  12/2005  Inui

FOREIGN PATENT DOCUMENTS

JP   4-75435 A    3/1992
JP   11-178231 A  7/1999
(Continued)

OTHER PUBLICATIONS

European Extended Search Report, Oct. 17, 2014, 6 pages.

*Primary Examiner* — Ula C. Ruddock
*Assistant Examiner* — Thomas Parsons
(74) *Attorney, Agent, or Firm* — Foley & Lardner LLP

(57) ABSTRACT

Even when temperature sensors (12, 13) used in a device for warming a battery (1) being not in use by using a battery-driven heater (2) have failed, the battery (1) is prevented from freezing. Based on a battery temperature (Tb) and an outside air temperature (Ta), times ($\Delta t1$ to $\Delta t8$) during which Tb will decrease down to a warming start temperature (Tb_start) are each set to the next controller startup time ($\Delta t$). A controller (9) is started up every $\Delta t$, at t2, t3, and t4, and checks whether Tb<Tb_start is satisfied or not. At t4 when Tb<Tb_start is satisfied, a heater (2) is battery-driven to warm the battery (1). After t0 when the outside air temperature sensor (13) fails, the outside air temperature (Ta) is set to a fixed value (Ta_const) and based on this Ta=Ta_const and the battery temperature (Tb), the above control is repeated. Accordingly, it is unlikely that the temperature information (Ta) from the outside air temperature sensor (13) that is at fault causes $\Delta t$ to become extremely long like $\infty$, so that it is avoided that the heater (2) cannot be operated because the controller (9) cannot be started up and the battery (1) freezes.

8 Claims, 7 Drawing Sheets

(51) Int. Cl.
  *H01M 10/635* (2014.01)
  *H01M 10/48* (2006.01)
  *H02J 7/00* (2006.01)
  *H01M 10/625* (2014.01)
  *H01M 2/10* (2006.01)
  *H01M 10/6571* (2014.01)

(52) U.S. Cl.
  CPC .......... *H01M10/615* (2015.04); *H01M 10/625* (2015.04); *H01M 10/633* (2015.04); *H02J 7/0021* (2013.01); *H02J 7/0029* (2013.01); *H01M 2/1077* (2013.01); *H01M 10/6571* (2015.04); *H01M 2220/20* (2013.01); *Y02T 10/7055* (2013.01)

(56) References Cited

FOREIGN PATENT DOCUMENTS

| | | |
|---|---|---|
| JP | 2003-203679 A | 7/2003 |
| JP | 2005-339980 A | 12/2005 |
| JP | 2007-097336 A | 4/2007 |
| JP | 2009-034366 A | 2/2009 |
| JP | 2010-088204 A | 4/2010 |

FIG.5

NEXT CONTROLLER START TIME $\Delta t$ (h)
(NO CONNECTION OF BATTERY CHARGER)

| BATTERY TEMPERATURE Tb (°C) \ OUTSIDE AIR TEMPERATURE Ta (°C) | | 40 | 25 | 10 | 0 | -10 | -16 | -17 | -25 | -40 |
|---|---|---|---|---|---|---|---|---|---|---|
| | 40 | ∞ | ∞ | 24 | 14 | 11 | 9 | 8.5 | 7 | 5.5 |
| | 25 | ∞ | ∞ | 24 | 14 | 10 | 8 | 7.5 | 6 | 4.5 |
| | 10 | ∞ | ∞ | 24 | 14 | 8 | 6.5 | 6 | 5 | 3.5 |
| | 0 | ∞ | ∞ | 24 | 14 | 7 | 5.5 | 5 | 4 | 2.5 |
| WARMING STOP TEMPERATURE Tb_stop | -10 | ∞ | ∞ | 24 | 14 | 5 | 3.5 | 3 | 2 | 1 |
| | -16 | ∞ | ∞ | 24 | 13 | 3 | 1 | 0.5 | 0.5 | 0.5 |
| WARMING START TEMPERATURE Tb_start | -17 | MAIN RELAY SWITCH ON, HEATER SWITCH ON, HEATER OPERATION | | | | | | | | |
| | -24 | | | | | | | | | |
| FREEZING POINT TEMPERATURE Tb_low | -25 | 0.5 | 0.5 | 0.5 | 0.5 | 0.5 | 1 | 1 | 1 | 6 |
| | -30 | 1 | 1.5 | 1.5 | 2 | 3 | 5 | 6 | 8 | 12 |

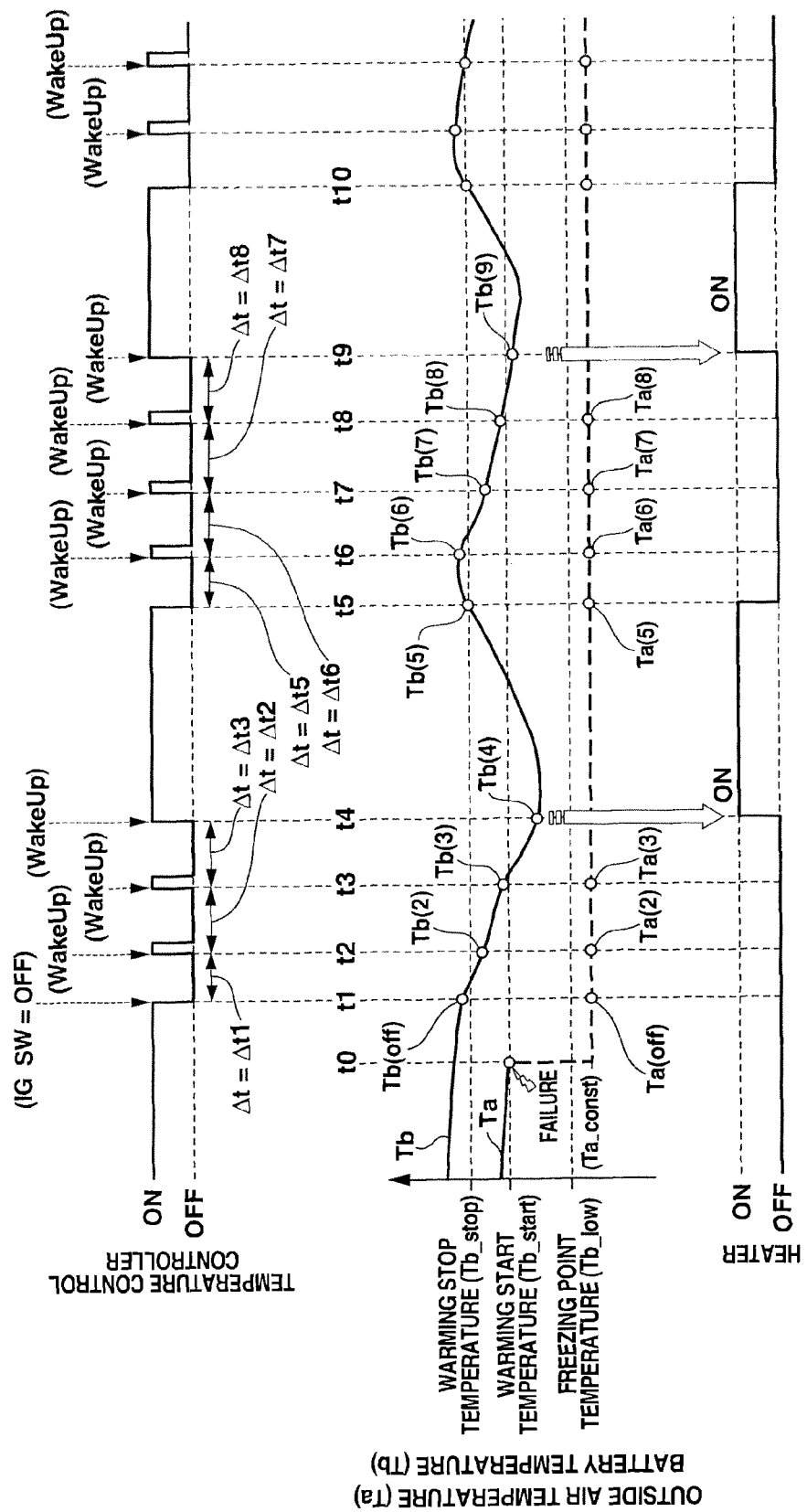

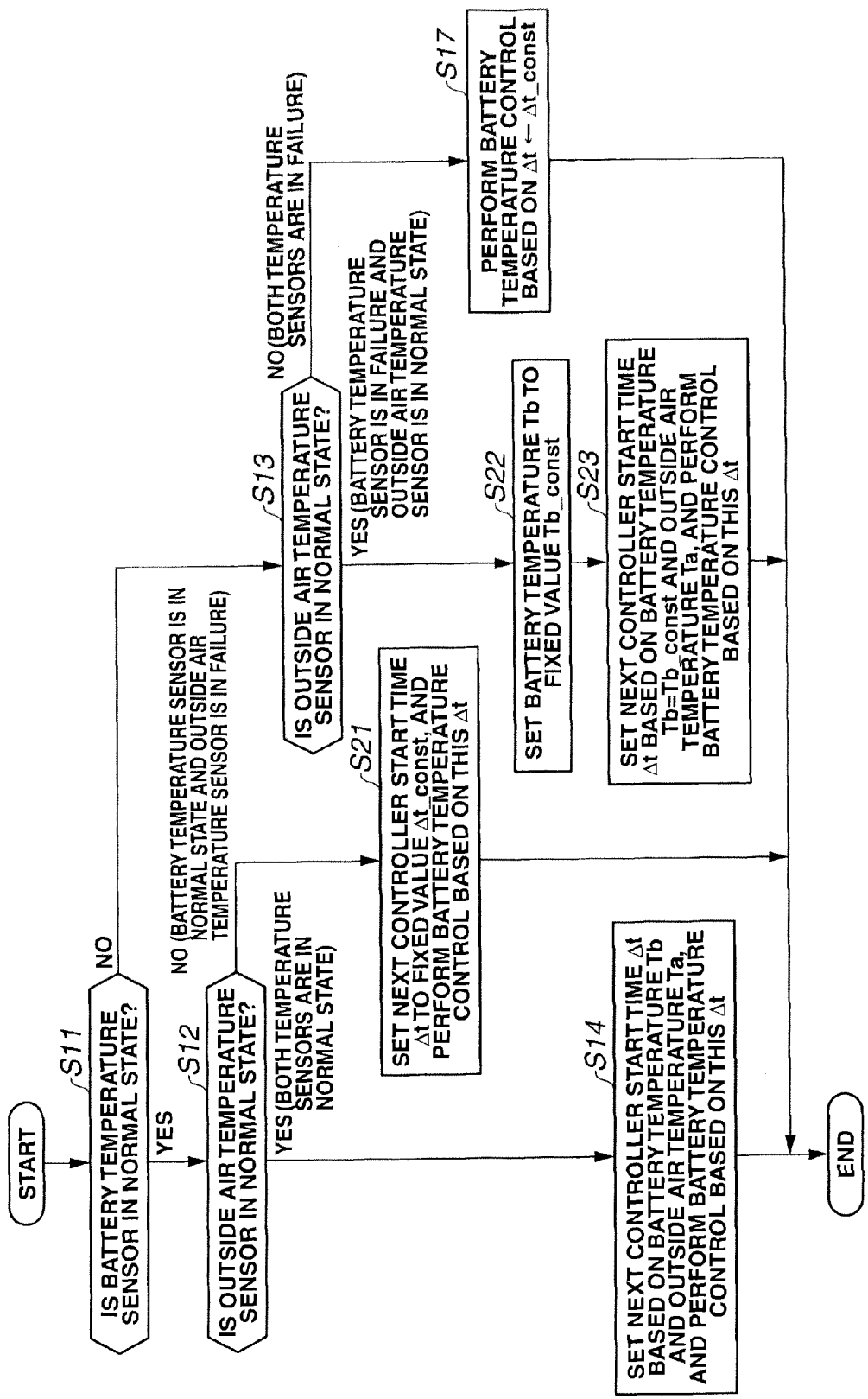

BATTERY TEMPERATURE CONTROL DEVICE

TECHNICAL FIELD

This invention relates to a battery temperature control device configured to prevent a temperature decrease of a battery which is used in a cold region, in particular, a temperature decrease during non-use.

BACKGROUND ART

In a battery which may be used in a cold area like a battery mounted on an electric vehicle, a battery electrolyte may be frozen during non-use.

When the temperature of the battery is lowered, an available input and output electric power of the battery is lowered by an increase of an internal resistance although a state of charge SOC is not lowered. The available input and output electric power finally becomes 0 when the battery electrolyte is frozen. The electric vehicle which uses the battery as an energy source for running cannot run.

Accordingly, there is needed a battery temperature control device configured to control the temperature by warming the battery by a heater before the temperature is lowered to be a state in which this inconvenience of the available input and output electric power is caused.

Conventionally, there has been proposed a battery temperature control device which is arranged to control the temperature by warming the battery by the heater in this way, and which is described, for example, in a patent document 1.

The battery temperature control device of this proposed art performs the temperature control of an in-vehicle battery. The battery is warmed by the heater when the outside air temperature is lowered than a lowest temperature in an OFF state of an ignition switch.

PRIOR ART DOCUMENT

Patent Document
Patent Document 1: Japanese Patent Application Publication No. 2003-203679

SUMMARY OF THE INVENTION

However, in the above-described conventional battery temperature control device, the battery is warmed by the heater only in accordance with the outside air temperature in the OFF state of the ignition switch. Accordingly, the heater is continued to be in the OFF state even when the heater is not switched to the ON state at the beginning of the OFF state of the ignition switch since the outside air temperature in the OFF state of ignition switch is high, and the outside air temperature is decreased since then.

In this case, even when the outside air temperature is lowered to the freezing point of the battery electrolyte, the heater is not switched to the ON state. The available input and output electric power finally becomes 0 due to the freeze of the battery electrolyte. Accordingly, there is caused a problem that the electric vehicle which runs by the battery electric power cannot run.

Accordingly, it is conceivable that it is checked once again whether or not the problematic temperature decrease is generated in the battery by performing the restart when the set time determined based on the temperature information from the temperature sensor is elapsed, and the battery is warmed by the switching of the heater to the ON state when the temperature is decreased.

However, when the temperature sensor is in the failure state, the above-described restart time becomes false. When this restart time becomes extremely long like ∞, the temperature decrease judgment to be performed once again is not performed. There is caused a problem that the battery is frozen.

In the present invention, when the temperature sensor is in the failure state, the restart time based on the temperature information from the temperature sensor which is in the failure state is varied to a time for the failure state of the temperature sensor so that the restart time does not become extremely long like ∞.

It is, therefore, an object of the present invention to propose a battery temperature control device devised to dissolve the above-described problem that the battery is frozen, by surely performing a re-judgment relating to a temperature decrease of a battery even in a failure state of a temperature sensor.

For this object, the battery temperature control device according to the present invention is constituted as follows.

First, the battery temperature control device which is a presupposition of the present invention is illustrated. This controls the temperature of the battery by warming the battery by the heater at the decrease of the temperature of the battery.

In the present invention, the battery temperature control device includes a warming necessity judging means and a temperature sensor failure set time varying means described below.

The former warming necessity judging means is configured to judge whether or not the battery is in the temperature low state after a set time determined based on temperature information obtained from respective temperature sensors arranged to sense temperatures of a plurality of portions is elapsed, and thereby to judge whether or not the warming by the heater is needed.

Moreover, the latter temperature sensor failure set time varying means is configured to set the set time to a time according to only the temperature information of one of the temperature sensors in the normal state, or a fixed time without using even the temperature information of the one of the temperature sensors in the normal state, in a failure state of another of the temperature sensors.

In this battery temperature control device according to the present invention, it is judged once again whether or not the battery is in the above-described temperature low state after the set time determined based on the temperature information from the temperature sensors arranged to sense the temperatures of the plurality of portions is elapsed. The battery temperature control device determines whether or not the warming by the heater is performed.

Accordingly, even when the heater is not initially switched to the ON state based on the temperature information, it is judged once again whether or not the battery is in the above-described temperature low state (the above-described judgment of the necessity of the warming by the heater) when the above-described prediction time is elapsed.

Consequently, even when the heater is not initially switched to the ON state, it is possible to surely control the temperature of the battery by the warming by the heater when the battery is in the above-described temperature low state since then.

Therefore, it is possible to avoid that the battery is remained in the temperature low state, and to prevent from falling into a worst situation such as a situation in which the battery electrolyte is frozen.

In the failure state of the another of the temperature sensors, the above-described set time is set to the time according to the temperature information from the one of the temperature sensors in the normal state, or to the fixed time without using even the temperature information of the one of the temperature sensors in the normal state.

Accordingly, the set time does not become extremely long like ∞. The judgment whether or not the battery is in the above-described temperature low state (the judgment of necessity of the warming by the heater), and which is to be performed after the set time is elapsed is surely performed even in the failure state of the temperature sensor. There is not caused the above-described problem that the battery is frozen.

BRIEF DESCRIPTION OF DRAWINGS

FIG. 5 is a map view of a next controller start time which is determined when a battery temperature during a non-use is in a temperature region in which there is no possibility that a freeze is generated.

FIG. 6 is an operation time chart showing an operation by the control program shown in FIG. 3 when an outside air temperature sensor is in a failure state.

FIG. 8 is a flowchart which shows a battery temperature control program of a battery temperature control device according to a second embodiment of the present invention, and which is identical to that of FIG. 3.

DESCRIPTION OF EMBODIMENTS

Figure 1:
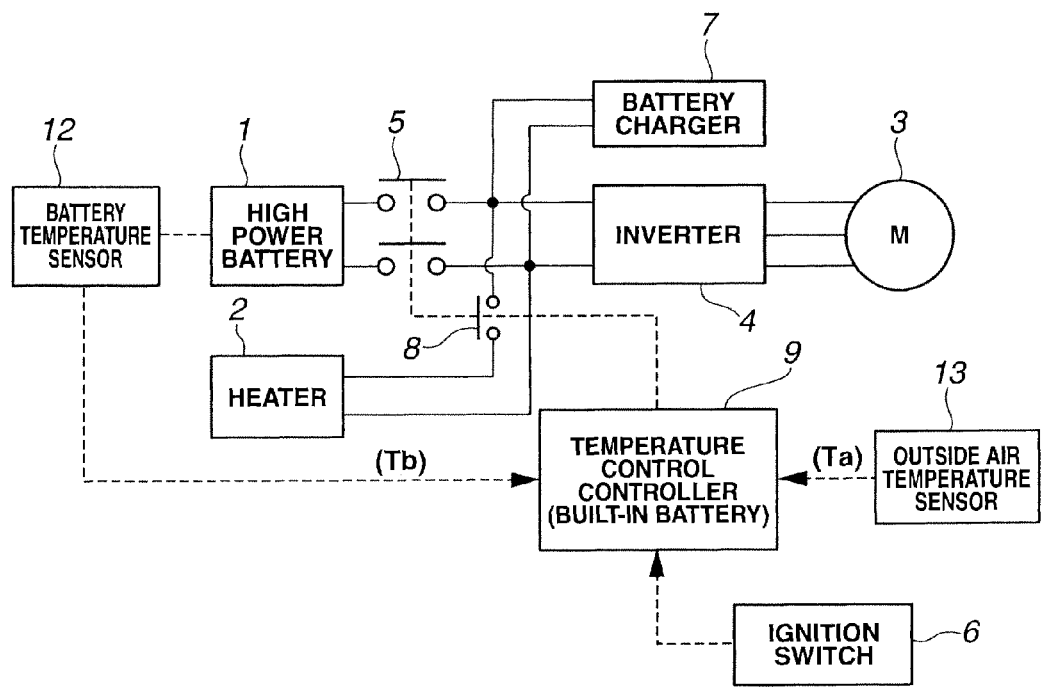
FIG. 1 is a control system view schematically showing a battery temperature control device according to a first embodiment of the present invention.

Hereinafter, embodiments according to the present invention are illustrated in details with reference to examples shown in the drawings.

Structure of First Embodiment

FIG. 1 is a control system view showing a battery temperature control device according to a first embodiment of the present invention. In this embodiment, this battery temperature control device is a device for controlling a temperature of a high power (high rate) battery 1 of an electric vehicle such as an electric automobile and a hybrid vehicle.

Figure 2:
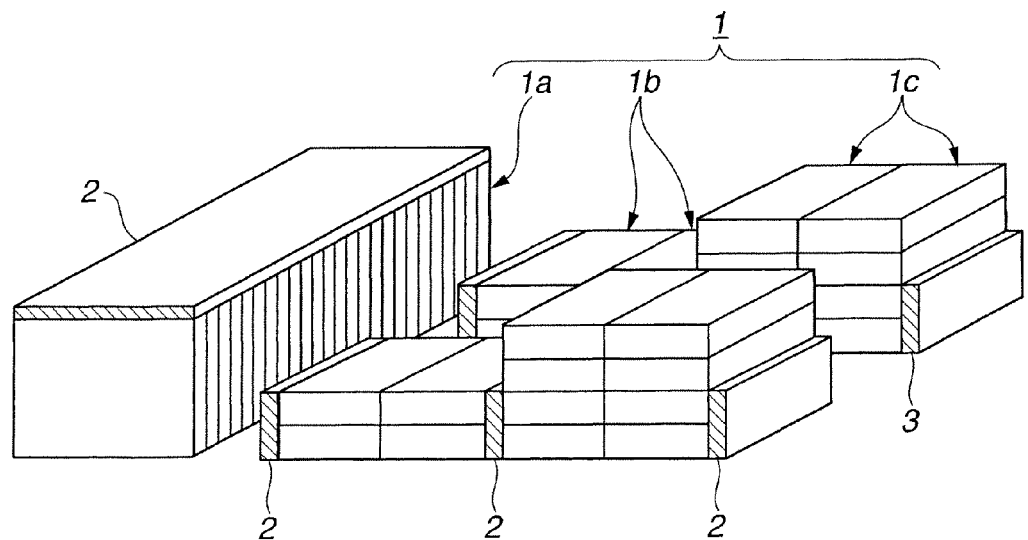
FIG. 2 is a perspective view of a battery showing an installation manner of heaters of FIG. 1.

Moreover, as shown in, for example, FIG. 2, in high power battery 1, a plurality of battery modules 1a, 1b, and 1c each having a plurality of battery shells stacked are integrally united as one set. High power battery 1 is a battery with a high capacity which can serve for driving the motor.

In this case, in the battery module 1a, the battery shells are disposed in a vertical direction, and stacked in a vehicle widthwise direction. The battery module 1a is positioned below a floor panel of a rear seat of the vehicle.

In the battery module 1b, the battery shells are disposed in a traverse (horizontal) direction, the battery shells are stacked in two layers in the upward and downward directions of the vehicle. The battery module 1b is positioned below the foot floor panel of the rear seat of the vehicle.

In the battery module, the battery shells are disposed in the traverse (horizontal) direction, the battery shells are stacked in four layers in the upward and downward directions of the vehicle. The battery module is positioned below a floor panel of a front seat of the vehicle.

In FIG. 1, numerals 2 are heaters for temperature control of the battery 1. As shown in FIG. 2, these heaters 2 are disposed along the stack directions of the battery shells with respect to the battery modules 1a, 1b, and 1c, and provided adjacent to the battery modules 1a, 1b, and 1c.

In FIG. 1, a numeral 3 is an electric motor used for driving and running the electric vehicle. This electric motor 3 is electrically connected to the battery 1 through an inverter 4.

A main relay switch 5 is disposed in a circuit between the inverter 4 and the battery 1. This main relay switch 5 is opened and closed through a drive controller (not shown) in conjunction with an ignition switch 6 of the electric vehicle. The main relay switch 5 is closed in an ON state of the ignition switch 6, and opened in an OFF state of the ignition switch 6.

While the main relay switch 5 is closed in conjunction with the ON state of the ignition switch 6, the direct current electric power from the battery 1 is converted from the direct current to the alternating current (the direct current→the alternating current) by the inverter 4, and outputted to the electric motor 3 under the control by the inverter 4. Accordingly, it is possible to run the electric vehicle by the drive of the motor 3.

When the main relay switch 5 is opened in conjunction with the OFF state of the ignition switch 6, the direct current electric power from the battery 1 cannot flow to the electric motor 3. Accordingly, it is possible to maintain the electric vehicle to the vehicle stop state by the stop of the motor 3.

A battery charger 7 is disposed and connected between the direct current side of the inverter 4 and the main relay switch 5. When this battery charger 7 is connected with an external power source, the main relay switch 5 is closed by a battery charge controller (not shown). With this, it is possible to charge the battery 1 by the external power source.

<Battery Temperature Control Device>

The temperature control device of the battery 1 which serves for the above-described use is illustrated below.

As described above with reference to FIG. 2, the heaters 2 are provided along the stack directions of the battery shells adjacent to the battery modules 1a, 1b, and 1c so as to perform the temperature control of the battery 1. As shown in FIG. 1, the heaters 2 are electrically connected between the direct current side of the inverter 4 and the main relay switch 5. A heater switch 8 is inserted and disposed in a circuit between this connection portion and the heater 2.

The opening and closing (switching) of the heater switch 8 is controlled by a temperature control controller 9 (a controller which has a built-in battery, and which can be self-started).

Moreover, this temperature control controller 9 opens and closes the main relay switch 5 while the main relay switch 5 is opened in conjunction with the OFF state of the ignition switch 6. In this case, when the heater switch 8 is closed, the temperature control controller 9 closes the main relay switch 5 in synchronism with this, so as to switch the heater 2 to the ON state. When the heater switch 8 is opened, the temperature control controller 9 opens the main relay switch 5 in synchronism with this, so as to switch the heater 2 to the OFF state.

The temperature control controller 9 receives an ON/OFF signal of the ignition switch 6, a signal from a battery temperature sensor 12 arranged to sense a temperature Tb of the battery 1, and a signal from an outside air temperature sensor 13 arranged to sense an outside air temperature Ta, for performing the ON/OFF control of the heater 2 through the above-described synchronous opening/closing of the heater switch 8 and the main relay switch 5.

Figure 3:
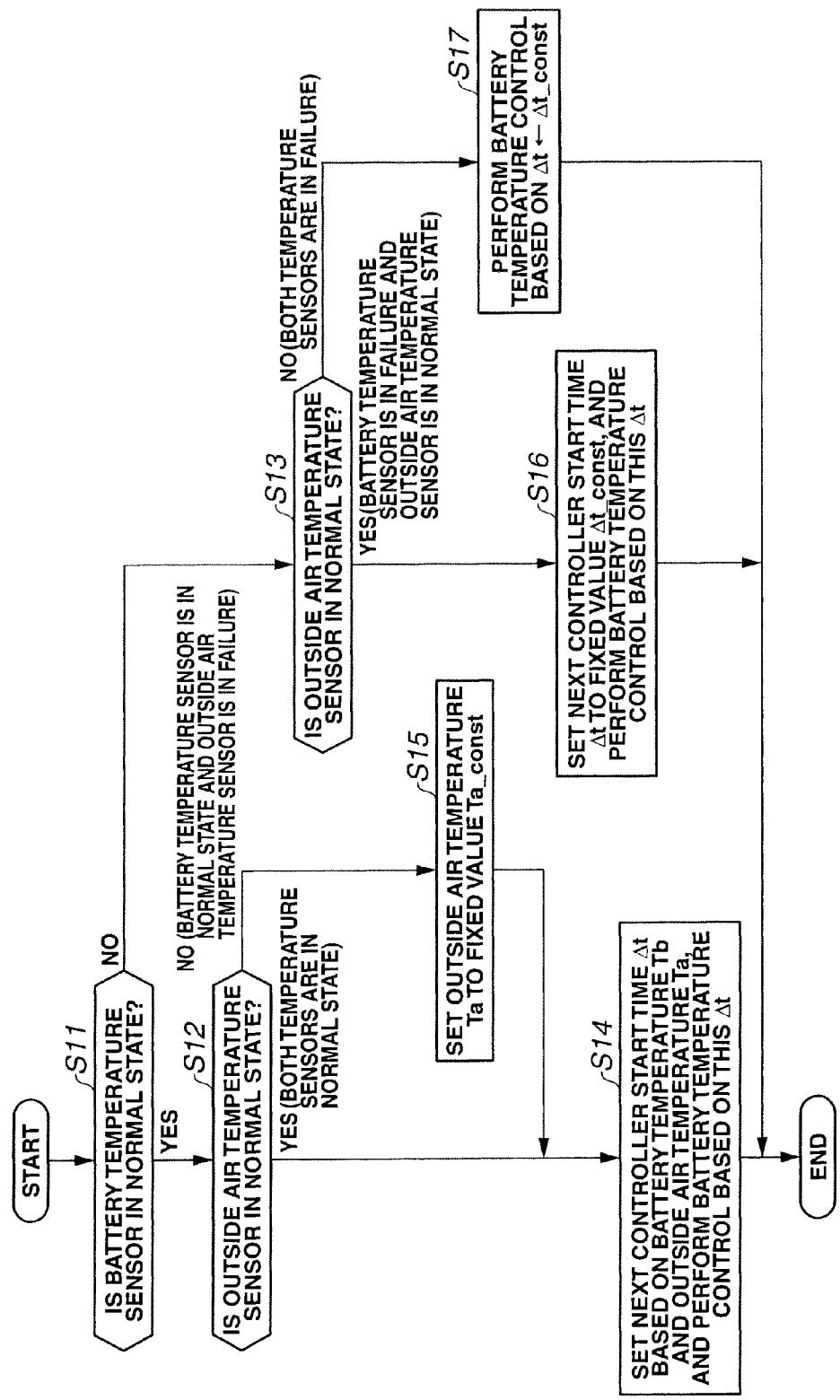
FIG. 3 is a flowchart showing a battery temperature control program performed by a temperature control controller of FIG. 1.

The temperature control controller 9 performs a control program shown in FIG. 3 based on these input information, from the OFF state of the ignition switch 6, so that the temperature control controller 9 performs the temperature control of the battery 1 by a following method.

At step S11, it is checked whether or not the battery temperature sensor 12 is in a normal state. At step S12 and step S13, it is checked whether or not the outside air temperature sensor 13 is in the normal state.

In these judgments, when the sensed values of the battery temperature sensor 12 and the outside air temperature sensor 13 are larger than abnormality judgment values, and smaller than abnormality judgment values, it is judged that the corresponding temperature sensors are in a failure state (failed). When the sensed values of the battery temperature sensor 12 and the outside air temperature sensor 13 are values within predetermined ranges, it is judged that the corresponding temperature sensors are in the normal state.

Besides, in this embodiment, the battery 1 is constituted by many battery modules 1a, 1b, and 1c, as shown in FIG. 2. Accordingly, there are a plurality of battery temperature sensors 12a. However, in this case, it is judged that the battery temperature sensor 12 is in the failure state when all of the battery temperature sensors 12 are in the failure state.

When there is one battery temperature sensor 12 in the normal state, the battery temperature control in the normal state of the temperature sensor described blow is performed by using the temperature information from the battery temperature sensor 12 in the normal state, and the temperature information from the outside air temperature sensor 13 in the normal state.

<Battery Temperature Control in Normal State of Temperature Sensors>

When it is judged that the battery temperature sensor 12 is in the normal state at step S11 and the outside air temperature sensor 13 is in the normal state at step S12, that is, when both of the temperature sensors 12 and 13 are in the normal states, the control proceeds to step S14. The battery temperature control in the normal state of the temperature sensor is performed as illustrated below with reference to FIGS. 4 and 5

Figure 4:
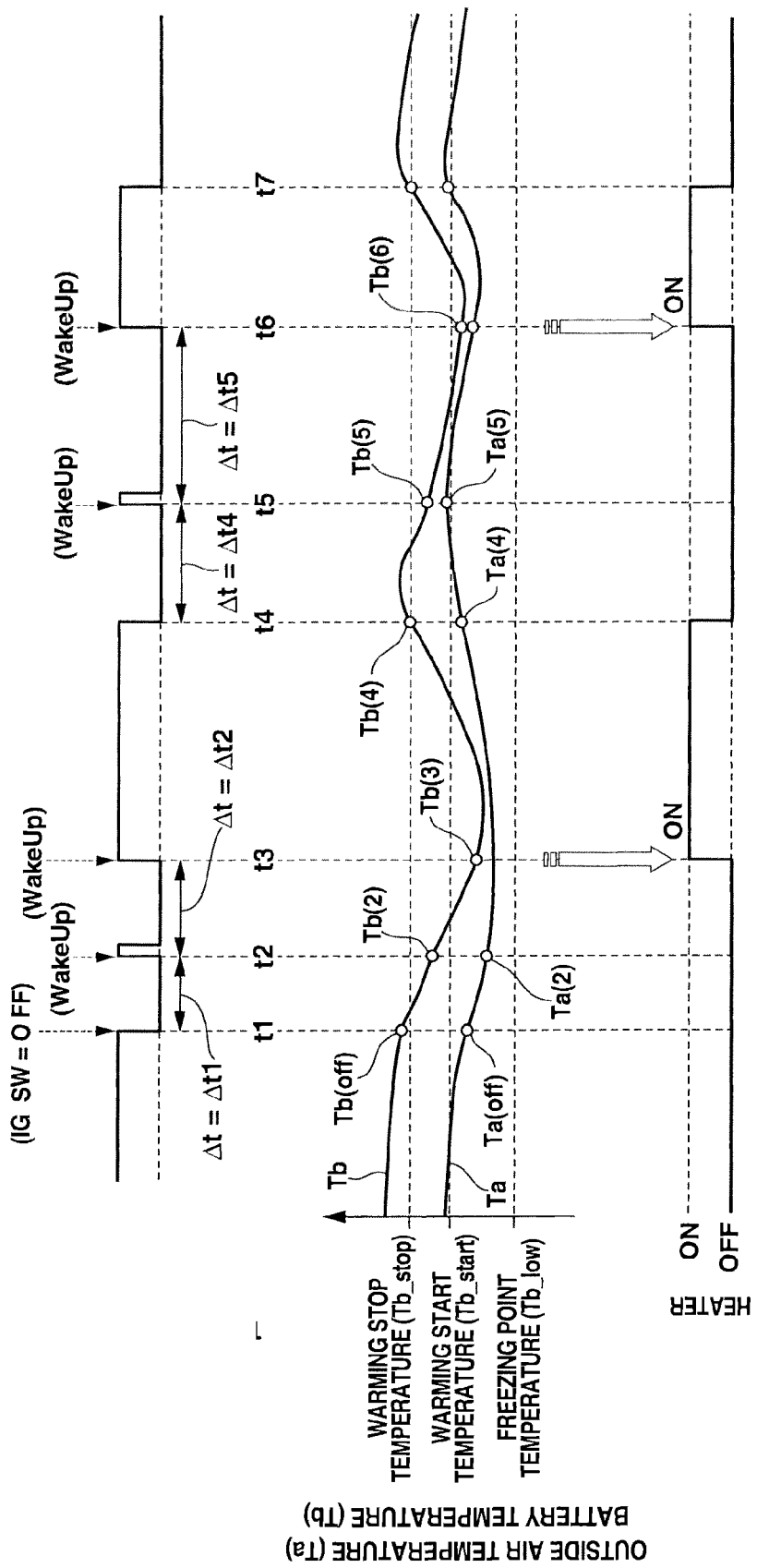
FIG. 4 is an operation time chart showing an operation by the control program shown in FIG. 3 when both temperature sensors are in a normal state.

FIG. 4 is an operation time chart when the outside air temperature Ta and the battery temperature Tb are varied with time as shown in the drawing. The main relay switch 5 is closed in conjunction with the ON state of the ignition switch 6 before an instant t1 at which the ignition switch 6 is switched to the OFF state. The vehicle is in a state in which the vehicle can run by the drive of the electric motor 3. Accordingly, the battery temperature control according to this embodiment is not performed at all.

When the ignition switch 6 is switched to the OFF state, it is checked whether or not the battery temperature Tb=Tb_off at the instant t1 is smaller than a warming start temperature Tb_start.

This warming start temperature Tb_start is a set value for judging whether or not the warming by the heater 2 is needed since an electrolyte of the battery 1 may be frozen. For example, this warming start temperature Tb_start is set as follows.

The battery electrolyte is frozen when the battery temperature Tb becomes smaller than an electrolyte freezing point temperature Tb_low (for example, substantially −25° C.−−30° C.), so that an available input and output power (allowable input and output power) of the battery 1 becomes 0.

For definitely preventing from falling into a worst situation, it is preferable that the battery 1 is warmed by the heater 2 from a timing at which the battery temperature Tb becomes a low temperature of, for example, a substantially −20° C., more preferably −17° C. to allow a margin.

Accordingly, in the present embodiment, the temperature of, for example, substantially −17° C. is set as the above-described warming start temperature Tb_start.

Moreover, in the present embodiment, the temperature of, for example, substantially −10° C. is set as a warming stop temperature Tb_stop at which the warming by the heater 2 needs to be stopped.

In FIG. 4, the battery temperature Tb=Tb_off at the instant t1 of the OFF state of the ignition switch is not smaller than the warming start temperature Tb_start. That is, for the moment, the battery temperature Tb is the high temperature at which the battery electrolyte will not be frozen. Accordingly, a time Δt1 during (by) which the battery temperature Tb=Tb_off is decreased to the warming start temperature Tb_start is predicted based on a map exemplified in FIG. 5 from the combination of the outside air temperature Ta=Ta_off and the battery temperature Tb=Tb_off at the instant t1 of the OFF state of the ignition switch. This time Δt1 is set to a sleep time (next controller start time) Δt after which the temperature control controller 9 is started at the next time.

The temperature control controller 9 measures an elapsed time from the instant t1 of the OFF state of the ignition switch, by a built-in timer. The temperature control controller 9 opens the heater switch 8 and the main relay switch 5 until an instant t2 at which the next controller start time Δt=Δt1 is elapsed, so as to become the sleep state in which the heater 2 is switched to the OFF state.

The temperature control controller 9 self-starts (wakes up) by the built-in battery at the instant t2 at which the next controller start time Δt=Δt1 is elapsed from the instant t1 of the OFF state of the ignition switch. The temperature control controller 9 checks whether or not the battery temperature Tb is decreased to the warming start temperature Tb_start during the above-described sleep, based on the battery temperature Tb=Tb(2) at the instant t2 of this wake-up.

In FIG. 4, the battery temperature Tb=Tb(2) at the instant t2 of the wake-up is not yet decreased to the warming start temperature Tb_start. Accordingly, the temperature control controller 9 again predicts a time Δt2 during (by) which the battery temperature Tb=Tb(2) is decreased to the warming start temperature Tb_start, based on the map exemplified in FIG. 5 from the combination of the outside air temperature Ta=Ta(2) and the battery temperature Tb=Tb(2) at the instant t2 of the wake-up. The temperature control controller 9 sets this time Δt2 to the sleep time (the next controller start time) Δt after which the temperature control controller 9 is started at the next time.

Then, the temperature control controller 9 measures the elapsed time from the instant t2 of the wake-up by the built-in timer. The temperature control controller 9 opens the heater switch 8 and the main relay switch 5 until an instant t3 at which the next controller start time Δt=t2 is elapsed, and maintains the sleep state in which the heater 2 is in the OFF state.

The temperature control controller 9 self-starts (wakes up) by the built-in battery at the instant t3 at which the next controller start time Δt=Δt2 is elapsed from the instant t2 of the wake-up. The temperature control controller 9 checks whether or not the battery temperature Tb=Tb(3) is decreased to the warming start temperature Tb_start during the above-described sleep from the battery temperature Tb=Tb(3) at the instant t3 of this wake-up.

In FIG. 4, the battery temperature Tb=Tb(3) at the instant t3 of the wake-up is decreased to the warming start temperature Tb_start. Accordingly, the temperature control controller 9 closes the heater switch 8 and the main relay switch 5, and thereby actuates the heater 2 (ON state) by the electric power from the battery 1 as shown in FIG. 4, so as to warm the battery 1 by this heater 2.

By this warming, the battery temperature Tb is gradually increased as shown in the drawing. At an instant t4 at which the battery temperature Tb is increased to the warming stop temperature Tb_stop, the temperature control controller 9 opens the heater switch 8 and the main relay switch 5 to switch the heater 2 to the OFF state as shown in the drawing, and thereby finishes the warming of the battery 1.

At the instant t4 of the end of the warming, the temperature control controller 9 predicts a time Δt4 during (by) which the battery temperature Tb=Tb(4) is decreased to the warming start temperature Tb_start, based on the map of FIG. 5 from the combination of the outside air temperature Ta=Ta(4) and the battery temperature Tb=Tb(4) at this time. The temperature control controller 9 sets this time Δt4 to the sleep time (the next controller start time) Δt after which the temperature control controller 9 is started at the next time.

Then, the temperature control controller 9 measures the elapsed time from the instant t4 of the end of the warming by the built-in timer. The temperature control controller 9 opens the heater switch 8 and the main relay switch 5 until an instant t5 at which the next controller start time Δt=Δt4 is elapsed, so as to become the sleep state in which the heater 2 is switched to the OFF state.

The temperature control controller 9 self-starts (wakes up) by the built-in battery at the instant t5 at which the next controller start time Δt=Δt4 is elapsed from the instant t4 of the end of the warming. The temperature control controller 9 checks whether or not the battery temperature Tb is decreased to the warming start temperature Tb_start during the above-described sleep, based on the battery temperature Tb=Tb(5) at the instant t5 of this wake-up.

In FIG. 4, the battery temperature Tb=Tb(5) at the instant t5 of the wake-up is not yet decreased to the warming start temperature Tb_start. Accordingly, the temperature control controller 9 again predicts a time Δt5 during (by) which the battery temperature Tb=Tb(5) is decreased to the warming start temperature Tb_start, based on the map exemplified in FIG. 5 from the combination of the outside air temperature Ta=Ta(5) and the battery temperature Tb=Tb(5) at the instant t5 of the wake-up. The temperature control controller 9 sets this time Δt5 to the sleep time (the next controller start time) Δt after which the temperature control controller 9 is started at the next time.

Then, the temperature control controller 9 measures the elapsed time from the instant t5 of the wake-up by the built-in timer. The temperature control controller 9 opens the heater switch 8 and the main relay switch 5 until an instant t6 at which the next controller start time Δt=Δt5 is elapsed, and maintains the sleep state in which the heater 2 is in the OFF state.

The temperature control controller 9 self-starts (wakes up) by the built-in battery at an instant t6 at which the next controller start time Δt=Δt5 is elapsed from the instant t5 of the wake-up. The temperature control controller 9 checks whether or not the battery temperature Tb=Tb(6) is decreased to the warming start temperature Tb_start during the above-described sleep from the battery temperature Tb=Tb(6) at the instant t6 of this wake-up.

In FIG. 4, the battery temperature Tb=Tb(6) at the instant t6 of the wake-up is decreased to the warming start temperature Tb_start. Accordingly, the temperature control controller 9 closes the heater switch 8 and the main relay switch 5, and thereby actuates the heater 2 (the ON state) by the electric power from the battery 1 as shown in FIG. 4, so as to warm the battery 1 by this heater 2.

By this warming, the battery temperature Tb is gradually increased as shown in the drawing. At an instant t7 at which the battery temperature Tb is increased to the warming stop temperature Tb_stop, the temperature control controller 9 opens the heater switch 8 and the main relay switch 5 to switch the heater 2 to the OFF state as shown in the drawing, and thereby finishes the warming of the battery 1.

The step S14 of FIG. 3 corresponds to a warming necessity judging means since the step S14 performs the above-described control.

<Effects of Battery Temperature Control in Normal State of Temperature Sensors>

By the repeat of the above-described control, a time after which the battery temperature Tb becomes smaller than the warming start temperature Tb_start is predicted from the combination of the battery temperature Tb and the outside air temperature Ta, while the battery temperature Tb is equal to or greater than the warming start temperature Tb_start, that is, while the battery electrolyte will not be frozen, during the non-use of the battery 1 by the OFF state of the ignition switch 6. This is set to the next controller start time Δt. When this next controller start time Δt is elapsed, it is judged whether or not the battery temperature Tb becomes smaller than the warming start temperature Tb_start by the self-start (the wake-up) of the temperature control controller 9. At this decrease of the battery temperature (Tb<Tb_start), the heater 2 is driven by the battery to warm the battery 1.

Accordingly, even when the heater 2 is not operated at the start of the temperature control of the battery 1 (in the OFF state of the ignition switch), it is judged whether or not the battery temperature Tb becomes smaller than the warming start temperature Tb_start (the judgment of the necessity of the warming by the above-described heater 2) by the above-described wake up once again when the next controller start time Δt is elapsed.

Therefore, even when the heater 2 is not operated for the Tb≥Tb_start at first, the temperature of the battery 1 is surely controlled by the warming of the heater 2 when the temperature becomes Tb<Tb_start by the following decrease of the temperature.

Accordingly, it is possible to avoid that the battery 1 is remained to a state in which the temperature is smaller than the warming start temperature Tb_start. Therefore, it is possible to prevent the worst situation in which the battery electrolyte is frozen.

Moreover, the temperature control controller 9 performs the above-described warming of the battery 1 by the heater 2 once again only when Tb<Tb_start is judged when the next controller start time Δt is elapsed. With this, it is possible to obtain the above-described effects.

Accordingly, during the non-use of the battery 1 by the OFF state of the ignition switch 6, the heater 2 is operated only when it is really needed (at the judgment of Tb<Tb_start). With this, it is possible to attain the above-described effects by the minimum consumed electric power. It is possible to keep an electric storage state (state of charge) of the battery 1 to a level in which the vehicle can run, during the long time period.

<Battery Temperature Control in Failure State of Outside Air temperature Sensor>

When it is judged that the battery temperature sensor 12 is in the normal state at the step S11 of FIG. 3 and however it is judged that the outside air temperature sensor 13 is in the abnormal state at the step S12, that is, when the battery temperature sensor 12 is in the normal state and however the outside air temperature sensor 13 is in the failure state (failed), the control proceeds to step S15. The outside air temperature Ta is set to a fixed value Ta_const without using the temperature information from the outside air temperature sensor 13 which is in the failure state.

In this case, the outside air temperature Ta is not used directly for the temperature control of the battery 1, unlike the battery temperature Tb. It is preferable that the fixed value Ta_const of the outside air temperature Ta which is set in the failure state (malfunction) of the outside air temperature sensor 13 arranged to sense the outside air temperature Ta is set to a low temperature which is lower than the freezing point temperature Tb_low of the battery electrolyte, and by which the next controller start time Δt is shortened, so as to be easy to warm the battery 1 by the heater 2.

Then, at next step S14, the next controller start time Δt is set based on the map exemplified in FIG. 5 from the combination of the above-described fixed outside air temperature Ta=Ta_const, and the battery temperature Tb sensed by the battery temperature sensor 12 in the normal state. The battery temperature control is performed by the manner identical to the above-described control in the normal state of the temperature sensor.

The battery temperature control performed at step S14 in this case is illustrated bellow with reference to FIG. 6.

FIG. 6 is an operation time chart in a case where the outside air temperature Ta and the battery temperature Tb are initially varied with the time as shown in the drawing, the outside air temperature sensor 13 is failed (in the failure state) at an instant t0 before an instant t1 at which the ignition switch 6 is switched to the OFF state, and the outside air temperature Ta is set to the fixed value Ta_const (step S15) without using the temperature information from the outside air temperature sensor 13 in the failure state.

The main relay switch 5 is closed in conjunction with the ON state of the ignition switch 6 before the instant t1 at which the ignition switch 6 is switched to the OFF state. The vehicle is in a state in which the vehicle can run by the drive of the electric motor 3. Accordingly, the battery temperature control according to this embodiment is not performed at all.

Accordingly, Ta=Ta_const during the instant t0-t1 does not relate to the battery temperature control.

When the ignition switch 6 is switched to the OFF state at the instant t1, it is checked whether or not the battery temperature Tb=Tb_off at the instant t1 is smaller than the warming start temperature Tb_start at which the battery 1 needs to be warmed by the heater 2.

In FIG. 6, the battery temperature Tb=Tb_off at the instant t1 of the OFF state of the ignition switch is not smaller than the warming start temperature Tb_start (the battery temperature Tb is the substantially high temperature by which the battery electrolyte will not be frozen). Accordingly, the time Δt1 during (by) which the battery temperature Tb=Tb_off is decreased to the warming start temperature Tb_start is predicted based on the map exemplified in FIG. 5 from the combination of the outside air temperature Ta_off (the fixed outside air temperature Ta_const) and the battery temperature Tb=Tb_off at the instant t1 of the OFF state of the ignition switch. This time Δt1 is set to the sleep time (the next controller start time) Δt after which the temperature control controller 9 is started at the next time.

The temperature control controller 9 measures the elapsed time from the instant t1 of the OFF state of the ignition switch, by the built-in timer. The temperature control controller 9 opens the heather switch 8 and the main relay switch 5 until an instant t2 at which the next controller start time Δt=Δt1 is elapsed, so as to become the sleep state in which the heater 2 is switched to the OFF state.

The temperature control controller 9 self-starts (wakes up) by the built-in battery at the instant t2 at which the next controller start time Δt=Δt1 is elapsed from the instant t1 of the OFF state of the ignition switch. The temperature control controller 9 checks whether or not the battery temperature Tb is decreased to the warming start temperature Tb_start during the above-described sleep, based on the battery temperature Tb=Tb(2) at the instant t2 of this wake-up.

In FIG. 6, the battery temperature Tb=Tb(2) at the instant t2 of the wake-up is not yet decreased to the warming start temperature Tb_start. Accordingly, the temperature control controller 9 again predicts a time Δt2 during (by) which the battery temperature Tb=Tb(2) is decreased to the warming start temperature Tb_start, based on the map exemplified in FIG. 5 from the combination of the outside air temperature Ta=Ta(2) {the fixed outside air temperature Ta_const} and the battery temperature Tb=Tb(2) at the instant t2 of the wake-up. The temperature control controller 9 sets this time Δt2 to the sleep time (the next controller start time) Δt after which the temperature control controller 9 is started at the next time.

Then, the temperature control controller 9 measures the elapsed time from the instant t2 of the wake-up by the built-in timer. The temperature control controller 9 opens the heater switch 8 and the main relay switch 5 until the instant t3 at which the next controller start time Δt=Δt2 is elapsed, and maintains the sleep state in which the heater 2 is in the OFF state.

The temperature control controller 9 self-starts (wakes up) by the built-in battery at an instant t3 at which the next controller start time Δt=Δt2 is elapsed from the instant t2 of the wake-up. The temperature control controller 9 checks whether or not the battery temperature Tb=Tb(3) is decreased to the warming start temperature Tb_start during the above-described sleep, from the battery temperature Tb=Tb(3) at the instant t3 of the wake-up.

In FIG. 6, the battery temperature Tb=Tb(3) at the instant t3 of the wake-up is not yet decreased to the warming start temperature Tb_start. Accordingly, the temperature control controller 9 again predicts a time Δt3 during (by) which the battery temperature Tb=Tb(3) is decreased to the warming start temperature Tb_start, based on the map exemplified in FIG. 5 from the combination of the outside air temperature Ta=Ta(3) {the fixed outside air temperature Ta_const} and the battery temperature Tb=Tb(3) at the instant t3 of the wake-up. The temperature control controller 9 sets this time Δt3 to the sleep time (the next controller start time) Δt after which the temperature control controller 9 is started at the next time.

Then, the temperature control controller 9 measures the elapsed time from the instant t3 of the wake-up by the built-in timer. The temperature control controller 9 opens the heather switch 8 and the main relay switch 5 until an instant t4 at which the next controller start time Δt=Δt3 is elapsed, and thereby maintains the sleep state in which the heater 2 is in the OFF state.

The temperature control controller 9 self-starts (wakes up) by the built-in battery at the instant t4 at which the next controller start time Δt=Δt3 is elapsed from the instant t3 of the wake-up. The temperature control controller 9 checks whether or not the battery temperature Tb=Tb(4) is decreased to the warming start temperature Tb_start during the above-described sleep, from the battery temperature Tb=Tb(4) at the instant t4 of the wake-up.

In FIG. 6, the battery temperature Tb=Tb(4) at the instant t4 of the wake-up is decreased to the warming start temperature Tb_start. Accordingly, the temperature control controller 9 closes the heater switch 8 and the main relay switch 5, and thereby actuates the heater 2 (the ON state) by the electric power from the battery 1 as shown in FIG. 6 so as to warm the battery 1 by this heater 2).

By this warming, the battery temperature Tb is gradually increased as shown in the drawing. At an instant t5 at which the battery temperature Tb is increased to the warming stop temperature Tb_stop, the temperature control controller 9 opens the heater switch 8 and the main relay switch 5 to switch the heater 2 to the OFF state as shown in the drawing, and thereby finishes the warming of the battery 1.

At the instant t5 of the end of the warming, the temperature control controller 9 predicts a time Δt5 during (by) which the battery temperature Tb=Tb(5) is decreased to the warming start temperature Tb_start, based on the map of FIG. 5 from the combination of the outside air temperature Ta=Ta(5) {the fixed outside air temperature Ta_const} and the battery temperature Tb=Tb(5) at this time. The temperature control controller 9 sets this time Δt5 to the sleep time (the next controller start time) Δt after which the temperature controller 9 is started at the next time.

Then, the temperature control controller 9 measures the elapsed time from the instant t5 of the end of the warming by the built-in timer. The temperature control controller 9 opens the heater switch 8 and the main relay switch 5 until an instant t6 at which the next controller start time Δt=Δt5 is elapsed, so as to become the sleep state in which the heater 2 is switched to the OFF state.

The temperature control controller 9 self-starts (wakes up) by the built-in battery at an instant t6 at which the next controller start time Δt=Δt5 is elapsed from the instant t5 of the end of the warming. The temperature control controller 9 checks whether or not the battery temperature Tb is decreased to the warming start temperature Tb_start during the above-described sleep, based on the battery temperature Tb=Tb(6) at the instant t6 of this wake-up.

In FIG. 6, the battery temperature Tb=Tb(6) at the instant t6 of the wake-up is not yet decreased to the warming start temperature Tb_start. Accordingly, the temperature control controller 9 again predicts a time Δt6 during (by) which the battery temperature Tb=Tb(6) is decreased to the warming start temperature Tb_start, based on the map exemplified in FIG. 5 from the combination of the outside air temperature Ta=Ta(6) {the fixed outside air temperature Ta_const} and the battery temperature Tb=Tb(6) at the instant t6 of the wake-up. The temperature control controller 9 sets this time Δt6 to the sleep time (the next controller start time) Δt after which the temperature control controller 9 is started at the next time.

Then, the temperature control controller 9 measures the elapsed time from the instant t6 of the wake-up by the built-in timer. The temperature control controller 9 opens the heater switch 8 and the main relay switch 5 until an instant t7 at which the next controller start time Δt=Δt6 is elapsed, and maintains the sleep state in which the heater 2 is in the OFF state.

The temperature control controller 9 self-starts (wakes up) by the built-in battery at the instant t7 at which the next controller start time Δt=Δt6 is elapsed from the instant t6 of the wake-up. The temperature control controller 9 checks whether or not the battery temperature Tb=Tb(7) is decreased to the warming start temperature Tb_start during the above-described sleep from the battery temperature Tb=Tb(6) at the instant t7 of this wake-up.

In FIG. 6, the battery temperature Tb=Tb(7) at the instant t7 of the wake-up is not yet decreased to the warming start temperature Tb_start. Accordingly, the temperature control controller 9 again predicts a time Δt7 during (by) which the battery temperature Tb=Tb(7) is decreased to the warming start temperature Tb_start, based on the map exemplified in FIG. 5 from the combination of the outside air temperature Ta=Ta(7) {the fixed outside air temperature Ta_const} and the battery temperature Tb=Tb(7) at the instant t7 of the wake-up. The temperature control controller 9 sets this time Δt7 to the sleep time (the next controller start time) Δt after which the temperature control controller 9 is started at the next time.

Then, the temperature control controller 9 measures the elapsed time from the instant t7 of the wake-up by the built-in timer. The temperature control controller 9 opens the heater switch 8 and the main relay switch 5 until an instant t8 at which the next controller start time Δt=Δt7 is elapsed, and maintains the sleep state in which the heater 2 is in the OFF state.

The temperature control controller 9 self-starts (wakes up) by the built-in battery at the instant t8 at which the next controller start time Δt=Δt7 is elapsed from the instant t7 of the wake-up. The temperature control controller 9 checks whether or not the battery temperature Tb=Tb(8) is decreased to the warming start temperature Tb_start during the above-described sleep from the battery temperature Tb=Tb(8) at the instant t8 of this wake-up.

In FIG. 6, the battery temperature Tb=Tb(8) at the instant t8 of the wake-up is not yet decreased to the warming start temperature Tb_start. Accordingly, the temperature control controller 9 again predicts a time Δt8 during (by) which the battery temperature Tb=Tb(8) is decreased to the warming start temperature Tb_start, based on the map exemplified in FIG. 5 from the combination of the outside air temperature Ta=Ta(8) {the fixed outside air temperature Ta_const} and the battery temperature Tb=Tb(8) at the instant t8 of the wake-up. The temperature control controller 9 sets this time Δt8 to the sleep time (the next time controller start time) Δt after which the temperature control controller 9 is started at the next time.

Then, the temperature control controller 9 measures the elapsed time from the instant t8 of the wake-up by the built-in timer. The temperature control controller 9 opens the heater switch 8 and the main relay switch 5 until an instant t9 at which the next controller start time Δt=Δt8 is elapsed, and maintains the sleep state in which the heater 2 is in the OFF state.

The temperature control controller 9 self-starts (wakes up) by the built-in battery at the instant t9 at which the next controller start time Δt=Δt8 is elapsed from the instant t8 of the wake-up. The temperature control controller 9 checks whether or not the battery temperature Tb=Tb(9) is decreased to the warming start temperature Tb_start during the above-described sleep from the battery temperature Tb=Tb(9) at the instant t9 of this wake-up.

In FIG. 6, the battery temperature Tb=Tb(9) at the instant t9 of the wake-up is decreased to the warming start temperature Tb_start. Accordingly, the temperature control controller 9 closes the heater switch 8 and the main relay switch 5, and thereby actuates the heater 2 (the ON state) by the electric power from the battery 1 as shown in FIG. 6 so as to warm the battery 1 by this heater 2.

By this warming, the battery temperature Tb is gradually increased as shown in the drawing. At an instant t10 at which the battery temperature Tb is increased to the warming stop temperature Tb_stop, the temperature control controller 9 opens the heater switch 8 and the main relay switch 5 to switch the heater 2 to the OFF state as shown in the drawing, and thereby finishes the warming of the battery 1.

The step S14 of FIG. 3 corresponds to a warming necessity judging means and a temperature sensor failure set time varying means according to the present invention since the step S14 of FIG. 3 performs the above-described control.

<Effects of Battery Temperature Control in Failure State of Outside Air Temperature Sensor>

After the instant t10 of the end of the warming, a control identical to the above-described control is repeated. The battery temperature control identical to the above-described battery temperature control in the normal state of the temperature sensors is performed based on the next controller start time Δt according to the battery temperature Tb sensed by the battery temperature sensor 12 in the normal state, and the fixed outside air temperature Ta={Ta_const} which is alternative to the temperature information from the outside air temperature senor 13 in the failure state, during the non-use of the battery 1 by the OFF state of the ignition switch 6.

Accordingly, the next controller start time Δt does not become extremely long like ∞ by the temperature information from the outside air temperature sensor 13 in the failure state. The judgment whether or not the battery temperature Tb is smaller than the warming start temperature Tb_start (the necessity judgment of the warming by the heater 2) which should be performed once again when this next controller start time Δt is elapsed is surely performed even in the failure state of the outside air temperature sensor 13. Accordingly, it is possible to avoid the problem that the battery 1 is frozen since the warming cannot be performed.

Moreover, the above-described control is not that the battery 1 is always warmed by the heater 2 in the failure state of the outside air temperature sensor 13 so that the operation and effects are obtained. It is judged whether or not the battery temperature Tb is smaller than the warming start temperature Tb_start (the judgment of the necessity of the warming of the heater 2) at every timing at which the next controller start time Δt according to the battery temperature Tb sensed by the battery temperature sensor 12 in the normal state and the fixed outside air temperature Ta={Ta_const} which is alternative to the temperature information from the outside air temperature sensor 13 in the failure state is elapsed. The battery 1 is warmed by the heater 2 only when needed. The electric storage state of the battery 1 is not deteriorated at the early timing.

<Battery Temperature Control in Failure State of Battery Temperature Sensor>

When it is judged that the battery temperature sensor 12 is in the failure state at step S11 of FIG. 3 and it is judged that the outside air temperature sensor 13 is in the normal state at step S13, that is, when the outside air temperature sensor 13 is in the normal state and however the battery temperature sensor 12 is in the failure state, the control proceeds to step S16. As a matter of course, the temperature information from the battery temperature sensor 12 in the failure state is not used. Moreover, the temperature information from the outside air temperature sensor 13 in the normal state is also not used. The next controller start time Δt is set to a fixed value Δt_const without depending on the map search of FIG. 5. The battery temperature control is performed based on this.

Besides, it is preferable that the fixed next controller start time Δt=Δt_const is set shorter than the next controller start time Δt in the normal state of the both temperature sensors 12 and 13 so that the warming of the battery 1 by the heater 2 is early performed when the operation (function) of the battery temperature sensor 12 is recovered.

Hereinafter, the battery temperature control performed at the step S16 is illustrated based on FIG. 7.

Figure 7:
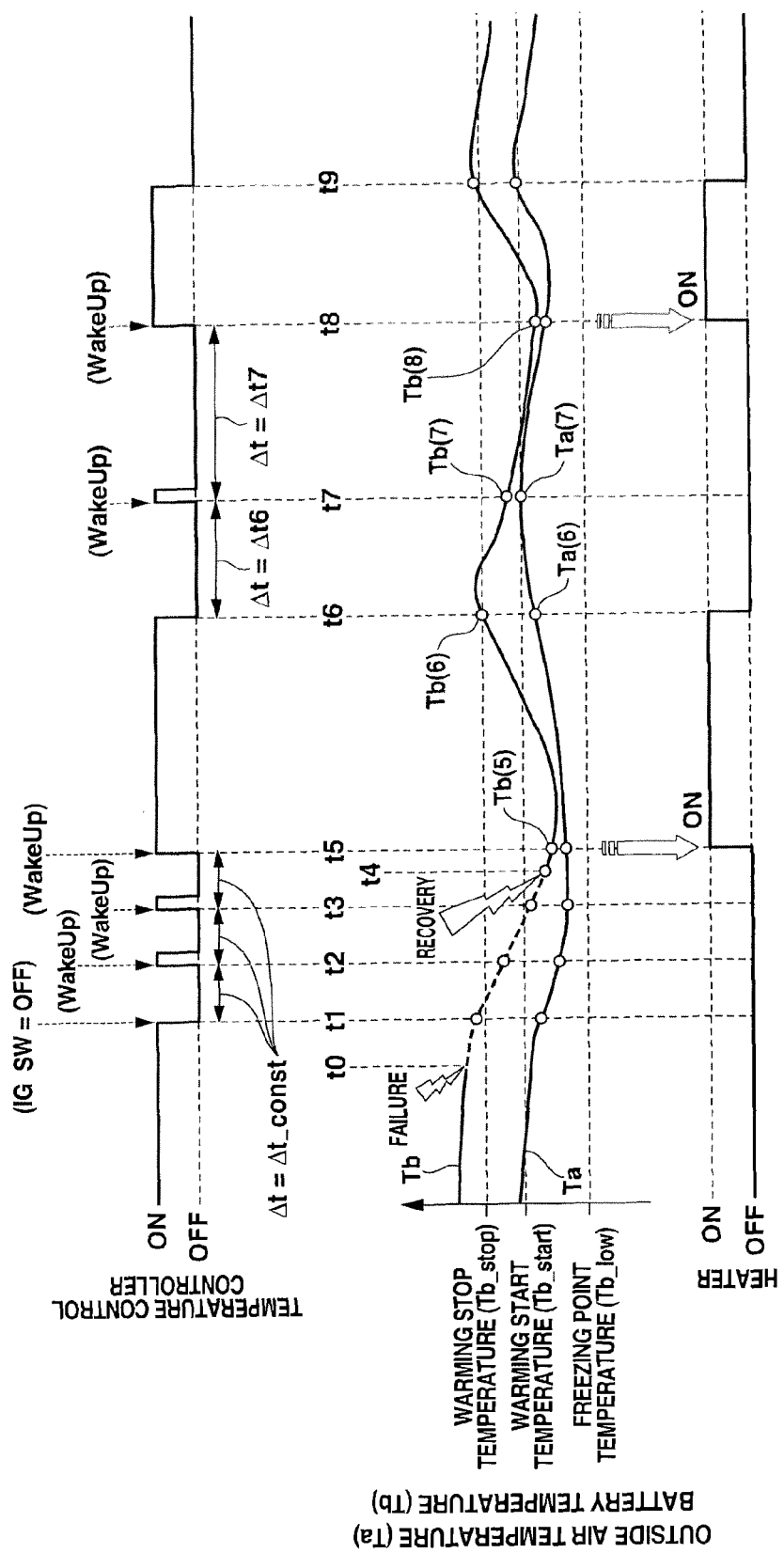
FIG. 7 is an operation time chart showing an operation by the control program shown in FIG. 3 when a battery temperature sensor is in the failure state.

FIG. 7 is an operation time chart when the next controller start time Δt is set to the fixed value Δt_const, of course, without using the temperature information from the battery temperature sensor 12 in the failure state, and without using the temperature information from the outside air temperature sensor 13 in the normal state since the battery temperature sensor 12 becomes the failure state at the instant t0 before the instant t1 at which the ignition switch 6 is switched to the OFF state although the outside air temperature Ta and the battery temperature Tb are respectively varied with the time as shown in the drawing.

Before the instant t1 at which the ignition switch 6 is switched to the OFF state, the main relay switch 5 is closed in conjunction with the ON state of the ignition switch 6. The vehicle is in a state in which the vehicle can run by the drive of the electric motor 3. Accordingly, the battery temperature control according to this embodiment is not performed at all.

When the ignition switch 6 is switched to the OFF state, the temperature control controller 9 opens the heater switch 8 and the main relay switch 5 at that instant t1, so as to become the sleep state in which the heater 2 is switched to the OFF state.

Then, the temperature control controller 9 measures the elapsed time from this instant t1 of the OFF state of the ignition switch by the built-in controller. The temperature control controller 9 "opens" the heater switch 8 and the main relay switch 5 until an instant t2 at which the fixed next controller start time Δt=Δt_const is elapsed, and maintains the sleep state in which the heater 2 is in the OFF state.

The temperature control controller 9 self-starts (wakes up) by the built-in battery at the instant t2 at which the fixed next controller stat time Δt=Δt_const is elapsed from the instant t1 of the OFF state of the ignition switch, and performs the control program of FIG. 3.

In this case, the temperature control controller 9 opens the heater switch 8 and the main relay switch 5 at step S16, so as to become the sleep state in which the heater 2 is switched to the OFF state.

The temperature control controller 9 measures the elapsed time from this instant t2 of the wake-up by the built-in timer. The temperature control controller 9 "opens" the heater switch 8 and the main relay switch 5 until an instant t3 at which the fixed next controller start time Δt=Δt_const is elapsed, and maintains the sleep state in which the heater 2 is in the OFF state.

The temperature control controller 9 self-starts (wakes up) by the built-in battery at the instant t3 at which the fixed next controller start time Δt=Δt_const is elapsed from t2 of the wake-up, and performs the control program of FIG. 3.

In this case, at step S16, the temperature control controller 9 opens the heater switch 8 and the main relay switch 5, so as to become the sleep state in which the heater 2 is in the OFF state.

The temperature control controller 9 measures the elapsed time from this instant t3, from the instant t3 of the wake-up. The temperature control controller 9 "opens" the heater switch 8 and the main relay switch 5 until an instant t5 at which the fixed next controller start time Δt=Δt_const is elapsed, and thereby maintains the sleep state in which the heater 2 is in the OFF state.

The step S16 of FIG. 3 performs the above-described control. Accordingly, the step S16 of FIG. 3 corresponds to the temperature sensor failure set time varying means and the warming necessity judging means.

In FIG. 7, the battery temperature sensor 12 is recovered from the failure state at an instant t4 during t3-t5 of the above-described sleep of the temperature control controller 9. The function of the battery temperature sensor 12 is recovered. From the instant t5 of the wake-up immediately after this instant t4, the temperature control controller 9 performs a loop in the normal state of the temperature sensor which passes the step S11, the step S12, and the step S14 of FIG. 3. The temperature control controller 9 does not perform the step S16.

Accordingly, at the instant t5 of the wake-up, the temperature control controller 9 checks whether or not the battery temperature Tb is decreased to the warming start temperature Tb_start based on the battery temperature Tb=Tb(5) at the instant t5, as is evident from the illustration described above at step S14.

In FIG. 7, the battery temperature Tb=Tb(5) at the instant t5 of the wake-up is decreased to the warming start temperature Tb_start. Accordingly, the temperature control controller 9 closes the heater switch 8 and the main relay switch 5, and thereby operates the heater 2 (ON state) by the electric power from the battery 1 as shown in FIG. 7, so as to warm the battery 1 by this heater 2.

By this warming, the battery temperature Tb is gradually increased as shown in the drawing. At an instant t6 at which the battery temperature Tb is increased to the warming stop temperature Tb_stop, the temperature control controller 9 opens the heater switch 8 and the main relay switch 5 to switch the heater 2 to the OFF state as shown in the drawing, and thereby finishes the warming of the battery 1.

At the instant t6 of the end of the warming, the temperature control controller 9 predicts a time $\Delta t6$ during (by) which the battery temperature Tb=Tb(6) is decreased to the warming start temperature Tb_start, based on the map of FIG. 5 from the combination of the outside air temperature Ta=Ta(6) and the battery temperature Tb=Tb(4) at this time. The temperature control controller 9 sets this time $\Delta t6$ to the sleep time (the next controller start time) $\Delta t$.

Then, the temperature control controller 9 measures the elapsed time from the instant t6 of the end of the warming by the built-in timer. The temperature control controller 9 opens the heater switch 8 and the main relay switch 5 until an instant t7 at which the next controller start time $\Delta t = \Delta t6$ is elapsed, so as to become the sleep state in which the heater 2 is switched to the OFF state.

The temperature control controller 9 self-starts (wakes up) by the built-in battery at the instant t7 at which the next controller start time $\Delta t = \Delta t6$ is elapsed from the time instant t6 of the end of the warming. The temperature control controller 9 checks whether or not the battery temperature Tb is decreased to the warming start temperature Tb_start during the above-described sleep, based on the battery temperature Tb=Tb(7) at the instant t7 of this wake-up.

In FIG. 7, the battery temperature Tb=Tb(7) at the instant t7 of the wake-up is not yet decreased to the warming start temperature Tb_start. Accordingly, the temperature control controller 9 again predicts a time $\Delta t7$ during (by) which the battery temperature Tb=Tb(7) is decreased to the warming start temperature Tb_start, based on the map exemplified in FIG. 5 from the combination of the outside air temperature Ta=Ta(7) and the battery temperature Tb=Tb(7) at the instant t7 of the wake-up. The temperature control controller 9 sets this time $\Delta t7$ to the sleep time (the next controller start time) $\Delta t$ after which the temperature control controller 9 is started at the next time.

Then, the temperature control controller 9 measures the elapsed time from the instant t7 of the wake-up by the built-in timer. The temperature control controller 9 opens the heater switch 8 and the main relay switch 5 until an instant t8 at which the next controller start time $\Delta t = \Delta t7$ is elapsed, and maintains the sleep state in which the heater 2 is in the OFF state.

The temperature control controller 9 self-starts (wakes up) by the built-in battery at the instant t8 at which the next controller start time $\Delta t = \Delta t7$ is elapsed from the instant t7 of the wake-up. The temperature control controller 9 checks whether or not the battery temperature Tb=Tb(8) is decreased to the warming start temperature Tb_start during the above-described sleep from the battery temperature Tb=Tb(8) at the instant t8 of this wake-up.

In FIG. 7, the battery temperature Tb=Tb(8) at the instant t8 of the wake-up is decreased to the warming start temperature Tb_start. Accordingly, the temperature control controller 9 closes the heater switch 8 and the main relay switch 5, and thereby actuates the heater 2 (the ON state) by the electric power from the battery 1 as shown in FIG. 7, so as to warm the battery 1 by this heater 2.

By this warming, the battery temperature Tb is gradually increased as shown in the drawing. At an instant t9 at which the battery temperature Tb is increased to the warming stop temperature Tb_stop, the temperature controller 9 opens the heater switch 8 and the main relay switch 5 to switch the heater 2 to the OFF state, and finishes the warming of the battery 1.

<Effects of Battery Temperature Control in Failure State of Battery Temperature Sensor>

By the above-described battery temperature control in the failure state of the battery temperature sensor, the next controller start time $\Delta t$ which is the sleep time after which the temperature control controller 9 is started is the fixed value $\Delta t\_const$, during the non-use of the battery 1 by the OFF state of the ignition switch 6. The temperature control controller 9 wakes up at every timing when this next controller start time $\Delta t$ is elapsed, and performs the control program of FIG. 3.

When the function (operation) of the battery temperature sensor 12 is recovered by the recovery of the battery temperature sensor 12 from the failure state, the battery temperature control identical to that of the temperature sensors in the normal state is surely rapidly performed at the wake-up immediately after the recovery of the function.

Accordingly, the next controller start time $\Delta t$ does not become extremely long like Go due to the temperature information from the battery temperature sensor 12 in the failure state. If the function (operation) of the battery temperature sensor 12 is recovered after this next controller start time $\Delta t$ is elapsed, the judgment of Tb<Tb_start of the battery temperature Tb (the judgment of the necessity of the warming by the heater 2) is surely performed. It is possible to avoid the problem that the warming cannot be performed although the function (operation) of the battery temperature sensor 12 is recovered, and that the battery 1 is frozen.

<Battery Temperature Control in Failure State of Both Temperature Sensors>

When it is judged that both of the battery temperature sensor 12 and the outside air temperature sensor 13 are in the failure state at step S11 and step S13 of FIG. 3, the control proceeds to step S17. The temperature information from the both of the temperature sensors 12 and 13 are not used. The next controller start time $\Delta t$ is set to a fixed value $\Delta t\_const$ without depending on the map search of FIG. 5. The battery temperature control is performed based on this.

Besides, it is preferable that the fixed next controller start time $\Delta t = \Delta t\_const$ is set shorter than the next controller start time $\Delta t$ in the normal state of the both temperature sensors 12 and 13 as described above with reference to step S16 of FIG. 3 so that the warming of the battery 1 by the heater 2 is early performed when the function (the operation) of the battery temperature sensors 12 and 13 are recovered.

The battery temperature control performed at step S17 is performed in a manner identical to that described with reference to step S16.

Accordingly, the next controller start time Δt does not become extremely long like ∞ by the temperature information from the battery temperature sensors 12 and 13 in the failure state. If the function (operation) of the battery temperature sensors 12 and 13 are recovered after this next controller start time Δt is elapsed, the judgment of Tb<Tb_start of the battery temperature Tb (the judgment of the necessity of the warming by the heater 2) is surely performed. It is possible to avoid the problem that the warming cannot be performed although the functions (operations) of the battery temperature sensors 12 and 13 are recovered, and that the battery 1 is frozen.

Second Embodiment

FIG. 8 is a battery temperature control program of a battery temperature control device according to a second embodiment of the present invention.

The present embodiment basically has a structure identical to that of the first embodiment. The battery temperature control program of FIG. 8 is performed in place of the battery temperature control program shown in FIG. 3 according to the first embodiment.

Step S11-step S14, and step S17 of FIG. 8 are steps which perform, respectively, the operations identical to those of the same symbols of FIG. 3. Accordingly, the illustrations are omitted. The only steps S21-step S23 which are different from FIG. 3 are illustrated.

When it is judged that the battery temperature sensor 12 is in the normal state at step S11 and however it is judged that the outside air temperature sensor 13 is in the abnormal state at step S12, that is, when the outside air temperature sensor 13 is in the failure state, the control proceeds to step S21. At step S21, as a matter of course, the temperature information from the outside air temperature sensor 13 which is in the failure state is not used. Moreover, the temperature information from the battery temperature sensor 12 in the normal state is also not used. The next controller start time Δt is set to a fixed value Δt_const without depending on the map search of FIG. 5. The battery temperature control is performed based on this as described above with respect to FIG. 7.

The step S21 performs the above-described control. Accordingly, the step S21 corresponds to the warming necessity judging means and the temperature sensor failure set time varying means in the present invention.

When it is judged that the battery temperature sensor 12 is in the failure state at step S11 and it is judged that the outside air temperature sensor 13 is in the normal state at step S13, that is, when the battery temperature sensor 12 is in the failure state, the control proceeds to a step S22 and a step S23. At step S22 and step S23, a battery temperature control is performed as follows.

At step S22, the battery temperature Tb is set to a fixed value Tb_const without using the temperature information from the battery temperature sensor 12 which is in the failure state since the battery temperature sensor 12 is in the failure state.

Besides, it is preferable that this fixed battery temperature Tb=Tb_const is set so that the next controller start time Δt is shorter than that in the normal state of the temperature sensor so as to frequently perform the wake-up of the temperature control controller 9.

At next step S23, the next controller start time Δt is set based on the map exemplified in FIG. 5 from the combination of the above-described fixed battery temperature Tb=Tb_const and the outside air temperature Ta sensed by the outside air temperature sensor 13 in the normal state. The battery temperature control is performed based on this like the above-described battery temperature control in the normal state of the temperature sensor. With this, in the battery temperature control device according to the second embodiment, it is possible to attain the above-described effects identical to that of the first embodiment.

The step S22 and step S23 performs the above-described control. Accordingly, the step S22 and step S23 correspond to the warming necessity judging section and the temperature sensor malfunction set time varying means in the present invention.

The invention claimed is:

1. A battery temperature control device arranged to warm a battery by a heater when a temperature of the battery is lowered, and thereby to control the temperature of the battery, the battery temperature control device comprising:
a self-starting controller including
a warming necessity judging section configured to judge whether or not the battery is in a temperature low state after elapse of a set time and to wake the controller after the set time, the set time being determined based on temperature information obtained from respective temperature sensors arranged to sense temperatures of a plurality of portions, and thereby to judge whether or not warming by the heater is needed when the battery is judged to be in the temperature low state, wherein, in the temperature low state, a temperature of the battery is lowered to a temperature that is less than or equal to a predetermined temperature; and
a temperature sensor failure set time varying section configured to set the set time, in a normal state of one of the temperature sensors and in a failure state of another of the temperature sensors, according to only temperature information of the one of the temperature sensors in the normal state, or according to a fixed time without using even the temperature information of the one of the temperature sensors in the normal state.

2. The battery temperature control device as claimed in claim 1, wherein the set time is a time predicted as a time after which the battery enters the temperature low state.

3. The battery temperature control device as claimed in claim 1, wherein the temperature sensors arranged to sense the temperatures of the plurality of portions comprise a battery temperature sensor arranged to sense a temperature of the battery, and an outside air temperature sensor arranged to sense a temperature of outside air.

4. The battery temperature control device as claimed in claim 3, wherein the temperature sensor failure set time varying section is configured to set temperature information relating to the temperature of the outside air to a fixed value when the outside air temperature sensor is in the failure state, and to set the set time in accordance with fixed outside air temperature information and temperature information from the battery temperature sensor.

5. The battery temperature control device as claimed in claim 4, wherein the fixed value of the temperature information relating to the temperature of the outside air is set so that the set time is shorter than a set time during which the battery enters the temperature low state, even when the temperature information of the battery temperature sensor in the normal state indicates a worst condition.

6. The battery temperature control device as claimed in claim 3, wherein the temperature sensor failure set time varying section is configured to set the set time to a fixed time when the battery temperature sensor is in the failure state.

7. The battery temperature control device as claimed in claim 6, wherein the fixed set time is a short time during which the battery does not enter the temperature low state.

8. The battery temperature control device as claimed in claim 1, wherein in a case where the temperature sensors arranged to sense the temperatures of the plurality of the portions are constituted by a temperature sensor group of a plurality of temperature sensors, the temperature sensor failure set time varying section is configured to determine that the temperature sensors are in the failure state when all of the temperature sensors of the temperature sensor group are in the failure state.

* * * * *